United States Patent
Zhou et al.

(10) Patent No.: US 12,515,696 B2
(45) Date of Patent: Jan. 6, 2026

(54) CONTROLLING VEHICLE USING STATIC OBJECTS AND HEADING ANGLE

(71) Applicant: Atieva, Inc., Newark, CA (US)

(72) Inventors: Tony X. Zhou, Westland, MI (US); Fei Zhu, Pleasanton, CA (US); Renyuan Zhang, Fremont, CA (US); Qiang Lu, Foster City, CA (US); Mohannad Murad, Pleasanton, CA (US); Jinwoo Lee, Hayward, CA (US)

(73) Assignee: Atieva, Inc., Newark, CA (US)

( * ) Notice: Subject to any disclaimer, the term of this patent is extended or adjusted under 35 U.S.C. 154(b) by 257 days.

(21) Appl. No.: 18/355,962

(22) Filed: Jul. 20, 2023

(65) Prior Publication Data

US 2025/0026367 A1   Jan. 23, 2025

(51) Int. Cl.
*B60W 60/00* (2020.01)
*B60W 40/105* (2012.01)
(Continued)

(52) U.S. Cl.
CPC ........ *B60W 60/001* (2020.02); *B60W 40/105* (2013.01); *B60W 40/13* (2013.01);
(Continued)

(58) Field of Classification Search
CPC .. B60W 60/001; B60W 40/105; B60W 40/13; B60W 2040/1315;
(Continued)

(56) References Cited

U.S. PATENT DOCUMENTS

| | | | |
|---|---|---|---|
| 6,076,030 A | 6/2000 | Rowe | |
| 9,650,039 B2 * | 5/2017 | Hocking | G01S 19/49 |

(Continued)

FOREIGN PATENT DOCUMENTS

| | | |
|---|---|---|
| DE | 102013020334 A1 | 8/2014 |
| EP | 3680877 A1 | 7/2020 |

(Continued)

OTHER PUBLICATIONS

Machine translation of JP 2002221574 downloaded from Espacenet May 27, 2025 (Year: 2025).*
(Continued)

*Primary Examiner* — Kito R Robinson
*Assistant Examiner* — Tanya C Sienko
(74) *Attorney, Agent, or Firm* — Brake Hughes Bellermann LLP

(57) ABSTRACT

An advanced driver assistance system (ADAS) controls a vehicle using two or more of: static objects, a vehicle heading angle, or a vehicle curvature at least when a satellite navigation signal is weak or lost. Distances from the vehicle to the static objects are measured by sensor(s) to be the same in both coordinate systems, and the vehicle location is found as an intersection between circles in the ground coordinate system. The ADAS can use sums of transverse and longitudinal distances, with a vehicle heading angle or a vehicle curvature, to determine the vehicle location with a weak or lost satellite signal, such as using a linear vehicle model or a curvature-based vehicle model.

23 Claims, 8 Drawing Sheets

(51) Int. Cl.
*B60W 40/13* (2012.01)
*H04B 17/318* (2015.01)

(52) U.S. Cl.
CPC ... *H04B 17/318* (2015.01); *B60W 2040/1315* (2013.01); *B60W 2420/403* (2013.01); *B60W 2420/408* (2024.01); *B60W 2554/20* (2020.02); *B60W 2554/80* (2020.02); *B60W 2556/35* (2020.02); *B60W 2556/50* (2020.02)

(58) Field of Classification Search
CPC ..... B60W 2420/403; B60W 2420/408; B60W 2554/20; B60W 2554/80; B60W 2556/35; B60W 2556/50; H04B 17/318; G01S 19/48; G01S 19/485; G01S 19/49; G01S 19/14; G05D 2111/10; G05D 2111/54; G05D 1/243; G05D 1/246; G05D 1/646; G05D 1/248; G05D 2105/22; G05D 2107/13; G05D 2109/10; G05D 2111/52; G01C 21/28

See application file for complete search history.

(56) References Cited

U.S. PATENT DOCUMENTS

| | | | |
|---|---|---|---|
| 10,150,474 | B2 | 12/2018 | Sterniak |
| 10,488,521 | B2 | 11/2019 | Wang et al. |
| 10,634,772 | B2 | 4/2020 | Eckstein et al. |
| 10,705,528 | B2 | 7/2020 | Wierzynski et al. |
| 2013/0338868 | A1 | 12/2013 | Essame et al. |
| 2015/0161895 | A1 | 6/2015 | You et al. |
| 2018/0051992 | A1 | 2/2018 | Croyle |
| 2019/0138007 | A1 | 5/2019 | Baghsorkhi et al. |
| 2019/0179311 | A1 | 6/2019 | Paden |
| 2019/0391587 | A1 | 12/2019 | Uvarov et al. |
| 2020/0086486 | A1 | 3/2020 | Graichen et al. |
| 2020/0150281 | A1* | 5/2020 | Yan .......................... G01S 19/49 |
| 2020/0174492 | A1 | 6/2020 | Lee et al. |
| 2020/0192391 | A1 | 6/2020 | Vora et al. |
| 2020/0198657 | A1 | 6/2020 | Manderla et al. |
| 2021/0405215 | A1 | 12/2021 | Hanczor et al. |
| 2022/0252404 | A1* | 8/2022 | Vora ........................ G01C 25/00 |
| 2024/0182082 | A1* | 6/2024 | Chen ................... B60W 60/0011 |

FOREIGN PATENT DOCUMENTS

| | | |
|---|---|---|
| EP | 3692339 A1 | 8/2020 |
| EP | 3805073 A1 | 4/2021 |
| JP | 2000080673 A | 3/2000 |
| JP | 2002221574 A * | 8/2002 |
| WO | 2006048310 A1 | 5/2006 |
| WO | 2019076044 A1 | 4/2019 |
| WO | 2020011025 A1 | 1/2020 |
| WO | 2020206071 A1 | 10/2020 |
| WO | 2022133253 A1 | 6/2022 |

OTHER PUBLICATIONS

International Search Report and Written Opinion for PCT Application No. PCT/US2024/038823, mailed on Oct. 24, 2024, 16 pages.
D. Ren et al.: "Trajectory Planning for Vehicle Lane Changing on Circular Road in Automated Highway System," IOSR Journal of Electrical and Electronics Engineering (IOSR-JEEE), vol. 14, Issue 6 Ser. I (Nov.-Dec. 2019), pp. 25-37.
H. Bai et al.: "Accelerated Lane-Changing Trajectory Planning of Automated Vehicles with Vehicle-to-Vehicle Collaboration," Hindawi, Journal of Advanced Transportation, vol. 2017, Article ID 8132769, 12 pages, https://doi.org/10.1155/2017/8132769.
Intellias: "Solving the Challenges of HD Mapping for Smart Navigation in Autonomous Cars," Blogpost, available online at: <https://www.intellias.com/solving-the-challenges-of-hd-mapping-for-smart-navigation-in-autonomous-cars/>, May 12, 2020, 9 pages.

\* cited by examiner

CONTROLLING VEHICLE USING STATIC OBJECTS AND HEADING ANGLE

TECHNICAL FIELD

This document relates to controlling a vehicle using static objects and a heading angle.

BACKGROUND

Some vehicles manufactured nowadays are equipped with one or more types of systems that can at least in part handle operations relating to the driving of the vehicle. Some such assistance operates based on receiving a satellite signal with navigation information to be used in continuously localizing the vehicle. However, satellite signals temporarily become weak or are lost altogether.

SUMMARY

In a first aspect, a method comprises: determining that a vehicle is at a first location; controlling motion of the vehicle using an advanced driver assistance system (ADAS); determining a second location for the vehicle based on receiving a first sensor return indicating at least a first static object and a second static object; determining a third location for the vehicle based on a heading angle of the vehicle and a first travel distance of the vehicle since the first location; determining a fourth location for the vehicle by fusing the second and third locations with each other; and controlling the motion of the vehicle using the ADAS based on the fourth location.

Implementations can include any or all of the following features. Determining that the vehicle is at the first location comprises receiving, by a satellite signal having at least a threshold signal strength, satellite navigation information indicating that the vehicle is at the first location, the method further comprising performing a first detection that the satellite signal no longer has the threshold signal strength, wherein the ADAS is configured to determine the second, third, and fourth locations in response to the first detection. The satellite navigation information is generated by a global navigation satellite system. The first detection comprises determining that the satellite navigation information contains information from less than a threshold number of satellites. Determining the second location comprises: determining, based on the satellite navigation information and the first sensor return, a first distance between the first location and the first static object; determining, based on the satellite navigation information and the first sensor return, a second distance between the first location and the second static object; receiving, after performing the first detection, a second sensor return indicating at least the first static object and the second static object; determining, based on the first travel distance and the second sensor return, a third distance between the vehicle and the first static object; and determining, based on the first travel distance and the second sensor return, a fourth distance between the vehicle and the first static object; wherein the second location is determined based on the third and fourth distances and the first travel distance. The satellite navigation information that indicates the vehicle being at the first location is a most recent satellite navigation information when the satellite signal no longer has the threshold signal strength. The method further comprises: performing, after controlling the motion of the vehicle using the ADAS based on the fourth location, a second detection that the satellite signal again has the threshold signal strength; and in response to the second detection, again controlling the motion of the vehicle using the ADAS based on the satellite navigation information. The method further comprises performing localization of the vehicle based on the fourth location and map information. The method further comprises performing global position alignment with regard to the vehicle based on the localization. The global position alignment is performed using a standard definition map. The heading angle is a measure calculated by the ADAS for use in controlling the motion of the vehicle. Multiple travel segments are determined, wherein a corresponding heading angle is determined for each of the multiple travel segments, and wherein the third location is determined based on the multiple travel segments and the corresponding heading angles. Determining the third location comprises: determining a longitudinal coordinate using a first formula, the longitudinal coordinate based on the multiple travel segments, the corresponding heading angles, and a longitudinal coordinate of the first location; determining a transverse coordinate using a second formula, the transverse coordinate calculated based on the multiple travel segments, the corresponding heading angles, and a transverse coordinate of the first location; and associating the longitudinal coordinate and the transverse coordinate with each other. Determining the third location comprises compensating the second location using the heading angle. The first sensor return is generated by at least one of a camera, a light detection and ranging device, or a radar device. The method further comprises classifying the first and second static objects before determining the second location. Fusing the second and third locations with each other comprises calculating an average of the second and third locations. Fusing the second and third locations with each other comprises weighting at least one of the second or third locations in determining the fourth location. At least the second, third and fourth locations are determined with regard to a center of gravity of the vehicle.

In a second aspect, a non-transitory computer readable medium stores instructions that when executed by at least one processor cause operations to be performed, the operations comprising: determining that a vehicle is at a first location; controlling motion of the vehicle using an advanced driver assistance system (ADAS); determining a second location for the vehicle based on receiving a first sensor return indicating at least a first static object and a second static object; determining a third location for the vehicle based on a heading angle of the vehicle and a first travel distance of the vehicle since the first location; determining a fourth location for the vehicle by fusing the second and third locations with each other; and controlling the motion of the vehicle using the ADAS based on the fourth location.

In a third aspect, a vehicle comprises: an advanced driver assistance system (ADAS) configured to control motion of the vehicle, the ADAS including a heading angle monitor configured to determine a heading angle of the vehicle; a sensor configured to generate a first sensor return indicating at least a first static object and a second static object; and a speed sensor configured to determine a first travel distance of the vehicle since a first location; wherein the ADAS is configured to i) determine a second location for the vehicle based on the first sensor return, ii) determine a third location for the vehicle based on the heading angle and the first travel distance, (iii) determine a fourth location for the vehicle by fusing the second and third locations with each other, and iv) control the motion of the vehicle based on the fourth location.

Implementations can include any or all of the following features. The vehicle further comprises a satellite receiver configured to receive a satellite signal having at least a threshold signal strength, the satellite signal including satellite navigation information indicating that the vehicle is at the first location, and wherein the ADAS is configured to determine the second, third, and fourth locations in response to a detection that that satellite signal no longer has the threshold signal strength. The vehicle further comprises, and the first sensor return is generated by, at least one of a camera, a light detection and ranging device, or a radar device.

BRIEF DESCRIPTION OF DRAWINGS

Like reference symbols in the various drawings indicate like elements.

DETAILED DESCRIPTION

Figure 1:
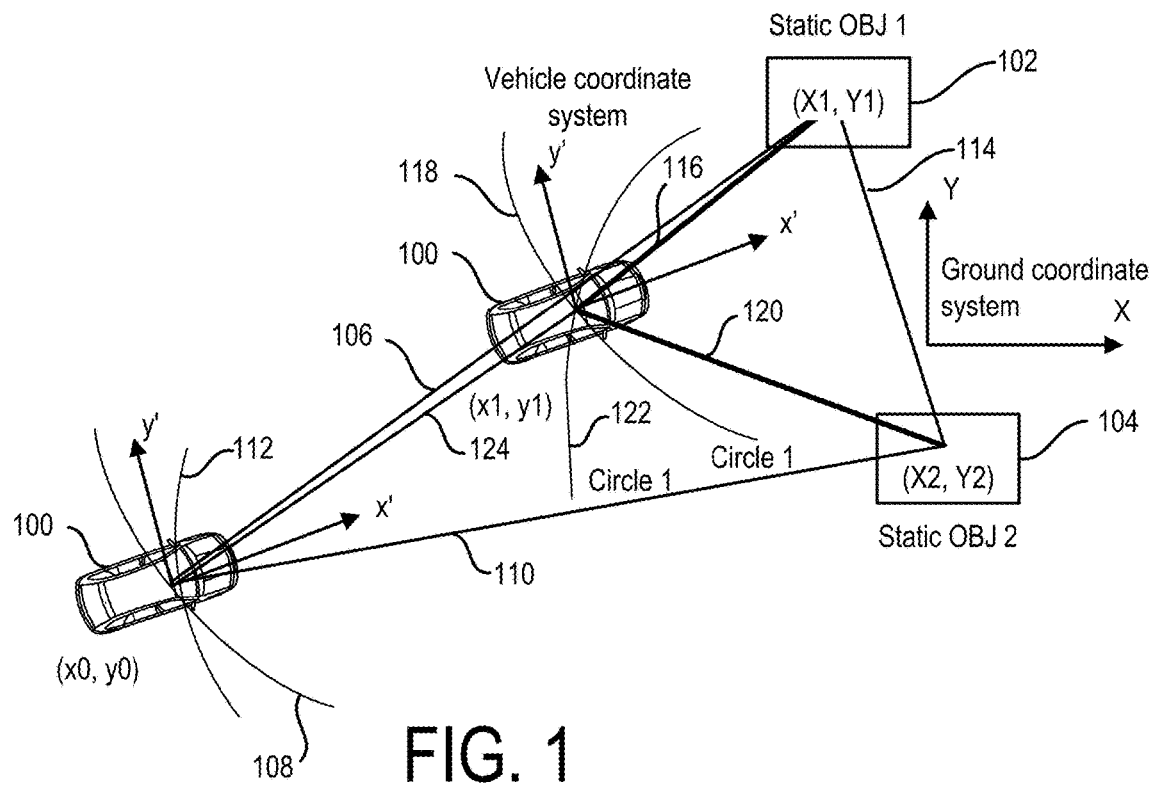
FIG. 1 shows an example where a vehicle is controlled by an advanced driver assistance system (ADAS) using static objects.

This document describes examples of computer-implemented systems and techniques for an advanced driver assistance system (ADAS) to control a vehicle using two or more of: static objects, a vehicle heading angle, or a vehicle curvature. In some implementations, the present subject matter can allow the ADAS to control the vehicle also during a period of time when a satellite navigation signal is weak or lost. A satellite receiver may be configured to receive signals from multiple satellites and use the received information in determining the location of the vehicle. The receiver may only be able to operate reliably if and while the received satellite navigation information has at least a threshold signal strength. For example, to achieve lane centering with an accuracy of about 40 centimeters (cm), which combines about 20 cm on the left side, and about 20 cm on the right side, of the vehicle, a certain number of satellites (e.g., four) may need to be detected. If the receiver detects signals from fewer than a threshold number of satellites this can be referred to as a weak or lost satellite signal.

The present disclosure can introduce a solution when a satellite navigation system has a weak signal or does not work for an autonomous drive application. For example, this can occur in remote mountainous areas, or in densely structured city environments, such as near tall buildings or inside parking garages. Autonomous driving relies on satellite navigation information and standard-definition or high-definition maps. Autonomous vehicles cannot operate without accurate localization. In response to a weak or lost satellite signal, the present disclosure can provide localization with information from sensors and surrounding environment as well as position from speed sensor and drifting alignment.

The present subject matter relates to any of multiple types of satellite navigation. A global satellite navigation system (GNSS) can provide essentially global coverage. A GNSS can include, but is not limited to, any of the Global Positioning System (GPS), the Global Navigation Satellite System (GLONASS), the BeiDou Navigation System, or the Galileo navigation system. The present subject matter can also or instead relate to a different satellite system having less than global coverage.

The present subject matter can use vehicle dynamics, e.g., an on-board sensor system, a wheel speed sensor, and a map in addition to satellite navigation information. The on-board sensor system can include cameras, radars, and/or other sensor(s). Sensor data processing can be used for static object return and compensation for a lane sensor. The speed sensor can provide ego driven distance and positioning.

The present subject matter can provide a geo-localization framework also when satellite navigation data is not available. Static object return and speed sensor positioning can be used for map aided positioning algorithm; stationary objects and/or traffic signals can be used in determining standard geolocation information using a standard-definition map. A wheel speed sensor can provide ego driven distance in y axis (vertical direction inside lane line). The present subject matter can be used with vision sensors and millimeter radar. In the present subject matter, a static object return, and/or compensation from lane centering, can greatly reduce computation burden and provide high precise localization with weak or no satellite signals.

Examples herein refer to a vehicle. A vehicle is a machine that transports passengers or cargo, or both. A vehicle can have one or more motors using at least one type of fuel or other energy source (e.g., electricity). Examples of vehicles include, but are not limited to, cars, trucks, and buses. The number of wheels can differ between types of vehicles, and one or more (e.g., all) of the wheels can be used for propulsion of the vehicle. The vehicle can include a passenger compartment accommodating one or more persons. At least one vehicle occupant can be considered the driver; various tools, implements, or other devices, can then be provided to the driver. In examples herein, any person carried by a vehicle can be referred to as a "driver" or a "passenger" of the vehicle, regardless whether the person is driving the vehicle, or whether the person has access to controls for driving the vehicle, or whether the person lacks controls for driving the vehicle. Vehicles in the present examples are illustrated as being similar or identical to each other for illustrative purposes only.

Examples herein refer to an ADAS. Assisted driving involves at least partially automating one or more dynamic driving tasks by way of computer-based operations (e.g., by a processor executing instructions). An ADAS can perform assisted driving and is an example of an assisted-driving system. Assisted driving is performed based in part on the output of one or more sensors typically positioned on, under, or within the vehicle, which is sometimes referred to as the ego vehicle. An ADAS can plan one or more trajectories for a vehicle before and/or while controlling the motion of the vehicle. A planned trajectory can define a path for the vehicle's travel. As such, propelling the vehicle according to the planned trajectory can correspond to controlling one or more aspects of the vehicle's operational behavior, such as, but not limited to, the vehicle's steering angle, gear (e.g., forward or reverse), speed, acceleration, and/or braking.

While an autonomous vehicle is an example of a system that performs assisted driving, not every assisted-driving system is designed to provide a fully autonomous vehicle. Several levels of driving automation have been defined by SAE International, usually referred to as Levels 0, 1, 2, 3, 4, and 5, respectively. For example, a Level 0 system or driving mode may involve no sustained vehicle control by the system. For example, a Level 1 system or driving mode may include adaptive cruise control, emergency brake assist, automatic emergency brake assist, lane-keeping, and/or lane centering. For example, a Level 2 system or driving mode may include highway assist, autonomous obstacle avoidance, and/or autonomous parking. For example, a Level 3 or 4 system or driving mode may include progressively increased control of the vehicle by the assisted-driving system. For example, a Level 5 system or driving mode may require no human intervention of the assisted-driving system.

Examples described herein refer to a light detection and ranging (LiDAR) device. As used herein, a LiDAR includes any object detection system that is based at least in part on light, wherein the system emits the light in one or more directions. The light can be generated by a laser and/or by a light-emitting diode (LED), to name just two examples. The LiDAR can emit light pulses in different directions (e.g., characterized by different polar angles and/or different azimuthal angles) so as to survey the surroundings. For example, one or more laser beams can be impinged on an orientable reflector for aiming of the laser pulses. The LiDAR can detect the return signals by a suitable sensor to generate an output. A scanning lidar or a non-mechanical scanning LiDAR can be used, to name just two examples.

Examples described herein refer to a camera. As used herein, a camera includes any image sensor that captures electromagnetic radiation.

Examples described herein refer to a radar. As used herein, a radar includes any object detection system that is based at least in part on radio waves.

Examples described herein refer to a standard-definition (SD) map. As used herein, an SD map includes any map that includes standard-definition map data, as opposed to high-definition map data. SD map data can have a resolution significantly lower than centimeter scale. SD map data can represent a multi-lane highway by a single curve in each direction of travel.

Examples described herein refer to a lane boundary. As used herein, a lane boundary includes any feature that the ADAS can detect to perceive that a lane ends or begins in any direction, including, but not limited to, a lane marking (e.g., a visually contrasted area of the surface), or a road marker (e.g., a pavement marker, a rumble strip, or an elevation difference).

FIG. 1 shows an example where a vehicle 100 is controlled by an ADAS using static objects 102, 104. In some implementations, the control takes place during a period of weak satellite navigation signal. The ADAS is installed for assisting in controlling the motion of the vehicle 100 (e.g., by providing autonomous driving), and the vehicle 100 is equipped with one or more types of sensors that provide outputs (here referred to as sensor returns) to be used by the ADAS. One or more aspects of the example can be used together with another example described elsewhere herein.

The ADAS of the vehicle 100 includes or uses a satellite receiver that receives satellite signals during some, but not all, conditions. During reliable reception, the satellite signals provide satellite navigation information that the ADAS can use in performing localization and thereby controlling the motion of the vehicle 100. However, the satellite signals may become weak or lost from time to time. The ADAS can then perform localization in another way, for example as will now be described.

The vehicle 100 is here shown at two locations. The location(s) of the vehicle 100 can be specified with reference to a vehicle coordinate system having axes that are here labeled X and Y. A location (x0, y0) of the vehicle 100 can be referred to as an initial location in this example. In the initial location the vehicle 100 may have a reliable satellite signal while in motion. For example, at this instant the satellite signal may have at least a threshold signal strength. At some subsequent instance, the satellite signal may be weak or lost. The satellite signal then no longer has the threshold signal strength. For example, the number of satellites seen by the satellite receiver may have fallen below a threshold number. Here, one such subsequent location is indicated by the coordinates (x1, y1). Because the satellite signal no longer has the threshold signal strength at this subsequent location, the coordinates (x1, y1) are not determined from any satellite navigation information. Rather, an approach involving the use of a sensor return can be applied, for example as follows.

The sensor(s) of the vehicle 100 can generate a sensor return that indicates at least the static object 102 and the static object 104. The sensor can include a camera, a radar, and/or a LiDAR, to name just a few examples. Each of the static objects 102-104 is static in the sense of not being merely temporarily present (e.g., unlike a stopped vehicle) and has a location that can be specified with reference to the ground coordinate system. For example, each of the static objects 102-104 may here be a building. Other types of static objects can be indicated by the sensor return, and may be associated with global positioning information in an SD map, as indicated in the following table:

| Static object | Global Positioning Information from Static Objects Global positioning information from SD map |
|---|---|
| Tree | Not applicable |
| Building | Some of them |
| Traffic Sign | Yes |

The static object 102 is here associated with a location (X1, Y1), and the static object 104 is here associated with a location (X2, Y2). The locations of the static objects 102-104 use capital letters to distinguish them from the locations of the vehicle 100. In some implementations, the positions may also include a third dimension (e.g., to represent a corresponding height of the respective static object).

Sensor returns can be generated by the sensor(s) essentially in a continuous fashion, such that a stream of data is output by the sensor. For purposes of localization, the ADAS can make use of the sensor return at least when the satellite signal becomes weak or is lost. For example, the ADAS continuously executes sampling cycles (e.g., many times every second) and in any of such cycles the present output of the sensor is the available sensor return. For fusing the locations calculated using different localization techniques, the locations to be fused can be determined in different sampling cycles from each other or in a common sampling cycle.

One or more distances can be determined using the sensor return. At the initial location (x0, y0), a distance 106 can be determined from the sensor return. The distance 106 is the distance from the location (x0, y0) to the location (X1, Y1) of the static object 102. Based on the distance 106, the ADAS can determine that the vehicle 100 is somewhere on a circle 108 (only partially shown) that is centered on the static object 102 and whose radius equals the distance 106. Similarly, at the initial location (x0, y0), a distance 110 from the location (x0, y0) to the location (X2, Y2) of the static object 104 can be determined from the sensor return. Based on the distance 110, the ADAS can determine that the vehicle 100 is somewhere on a circle 112 (only partially shown) that is centered on the static object 104 and whose radius equals the distance 110. Based on the distances 106 and 110, and the sensor return, a distance 114 between the static objects 102-104 can be determined.

At the subsequent location (x1, y1), the ADAS can similarly make use of the sensor return that is presently provided by the sensors, and likewise determine one or more distances relating to that location. At the subsequent location (x1, y1), a distance 116 from the subsequent location to the location (X1, Y1) of the static object 102 can be determined. Based on the distance 116, the ADAS can determine that the vehicle 100 is somewhere on a circle 118 (only partially shown) that is centered on the static object 102 and whose radius equals the distance 116. Also at the subsequent location (x1, y1), a distance 120 from the subsequent location to the location (X2, Y2) of the static object 104 can be determined. Based on the distance 120, the ADAS can determine that the vehicle 100 is somewhere on a circle 122 (only partially shown) that centers on the static object 104 and whose radius equals the distance 120.

The vehicle 100 includes one or more speed sensors by which a travel distance can be determined. Any type of speed sensor can be used that generates an output from which a travel distance 124 between the initial location and the subsequent location can be determined. In some implementations, the speed sensor detects, directly or indirectly, the rate at which at least one wheel of the vehicle 100 is rotating; using the size (e.g., circumference) of the wheel, the travel distance is determined. Based on the speed sensor output, the travel distance can be established with relatively high precision. For example, centimeter-level accuracy or better of the travel distance 124 can be obtained.

The travel distance 124 is here shown as extending from a central point of the vehicle 100 at the initial location, to the same central point of the vehicle 100 at the subsequent location. Any location within the body of the vehicle 100 can be used as the reference by the ADAS. In some implementations, a center of gravity of the vehicle 100 can be used. A vehicle coordinate system having axes that are here labeled x' and y' can be used for one or more purposes. The vehicle coordinate system can be based at the same location within the vehicle that the ADAS uses as its reference, or at a different location within the vehicle. The static objects 102-104 can be detected with reference to the vehicle coordinate system.

When the ADAS is in possession of at least some of the information described above, the ADAS can determine the subsequent location (x1, y1) of the vehicle 100 also when the satellite signal has become weak or been lost. For example, the distances 110 and 120, and the travel distance 124, together form a triangle so that the subsequent location (x1, y1) can be determined. The ADAS can receive the static object returns and can self-calculate the position of the vehicle 100, such as with centimeter level accuracy, since the ADAS knows the start point from the last available satellite navigation signal. Static objects such as buildings or traffic signs can provide positioning info as reference to calculate the position with 100% accuracy. This can provide a standard and a 100% accurate positioning reference when static objects are available to be detected.

The following are examples of operations that can be performed in estimating the location of the vehicle 100. The last known good satellite-signal location (e.g., (x0, y0)), can be used for determining a rough region of the current location. An SD map can be used for finding two or more static objects within the above-mentioned region. The SD map may provide accurate location information about the static objects (e.g., buildings or traffic lights). One or more onboard sensors can detect the static objects that are within sensor detection range from the vehicle. The detected static objects can be matched against the static objects identified using the SD map. The locations of the detected static objects can be given in the ground coordinate system (e.g., (X1, Y1) or (X2, Y2) in the above example). The onboard sensors can detect the static objects in the vehicle coordinate system. The distance from the vehicle to each of the static objects can be measured by the sensor(s). The distance between the vehicle and each static object is the same in both coordinate systems. Therefore, the vehicle 100 must be on the circles 118 and 122 at the subsequent location. The intersection point of these circles can define the vehicle location in the ground coordinate system. When more than two static objects are detected, a best fit vehicle location can be determined from them. For example, regression can be performed based on the available data. After the vehicle location is determined, the heading angle of the vehicle can be determined by the difference between the azimuth angles of the same static object in the ground coordinate system and the vehicle coordinate system. When more than two static objects are detected, a best fit heading angle can be determined. For example, averaging of available data can be performed. In some implementations, elevation of the vehicle 100 can be determined if the vertical position of the static objects 102 and/or 104 is available. The position transformation from the vehicle coordinates to the ground coordinates can be done in analogy with the transformation mentioned above.

While the satellite navigation information is not available, the sensor-based localization can continue periodically according to the sensor refresh rate. In parallel, the satellite signal strength can be continuously checked. When the satellite signal strength improves, the satellite navigation information can override the results from the sensor-based estimate, and the last known good satellite location (e.g., (x0, y0) in the above example) can be reset using the most recent input from the satellite navigation information.

In the present subject matter, one or more techniques can be applied to provide localization during a weak or lost satellite signal. The above example, which involves a sensor return indicating static objects, is one such technique. Availability of this or other techniques is exemplified in the following table:

| Availability of Technique for Position-Related Processing | |
|---|---|
| Data Stream | Availability |
| Static object | Sometimes |
| Compensation from lane sensing | All the time |
| Calculated positioning | All the time |

Figure 2:
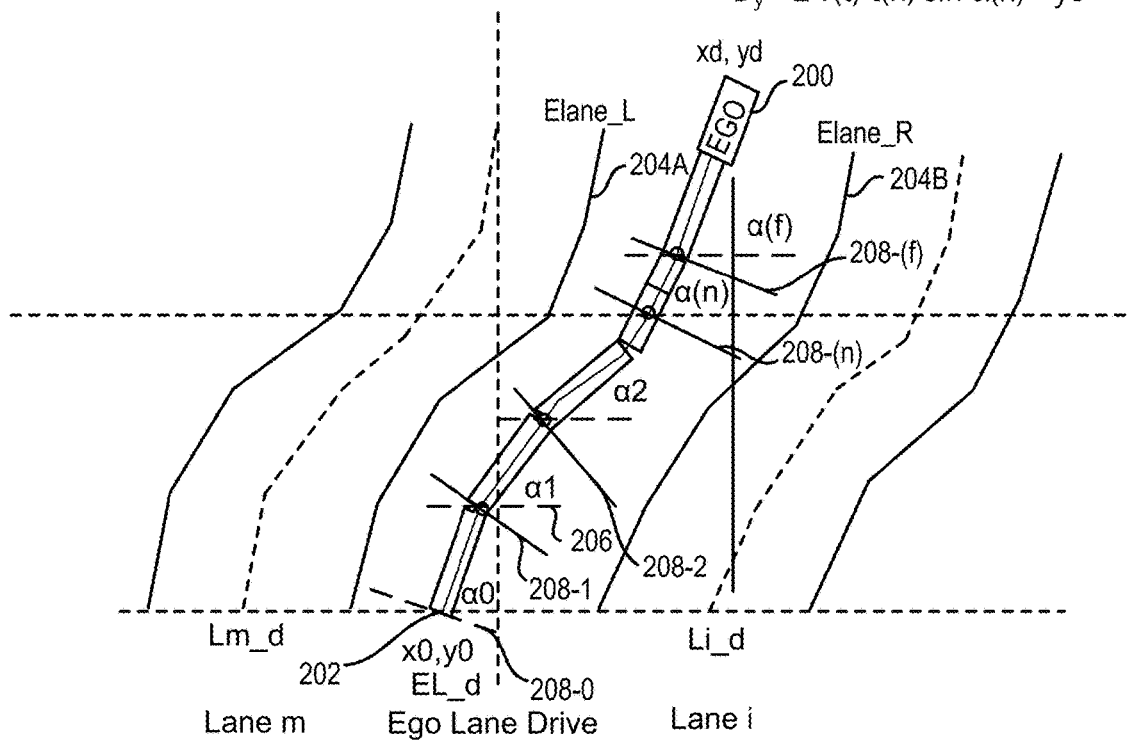
FIG. 2 shows an example where a vehicle is controlled by an ADAS using lane sensing information.

FIG. 2 shows an example where a vehicle 200 is controlled by an ADAS using lane sensing information. In some implementations, the control takes place during a period of weak satellite navigation signal. One or more aspects of the example can be used together with another example described elsewhere herein. Lane sensing information can be generated by a lane monitoring system of the ADAS. In some implementations, lane sensing information includes distance from the wheel(s) to the lane marker. For example, the distance from the left wheel to the left lane marker, and/or the distance from the right wheel to the right lane marker, can be determined. In some implementations, lane sensing information includes a lane confidence measure. For example, a left lane confidence and/or a right lane confidence can be determined. In some implementations, lane sensing information includes a lane curvature measure. In some implementations, lane sensing information includes a lane heading angle. In some implementations, lane sensing information identifies the lane among multiple lanes in which the ego vehicle is traveling.

The example shows the vehicle 200 traveling in a lane labeled "Ego Lane Drive." On each side of this lane are adjacent lanes labeled "Lane m" and "Lane i," respectively. The vehicle 200 begins at an initial location 202 within the ego lane, the initial location 202 having coordinates (x0, y0). The ego lane can be defined by lane boundaries on either side. Here, a lane boundary 204A is on the left and labeled "ELane_L," and a lane boundary 204B is on the right and labeled "ELane_R." The curvature of the lanes where the vehicle 200 is traveling can be described as:

$$LeftLane = \rho x2 + \psi hx + DLL, \text{ and}$$

$$RightLane = \rho x2 + \psi hx + DRL,$$

where ρ is the curvature of the road, ψh is the lane heading angle, DLL is the distance to the left lane, and DRL is the distance to the right lane. The curvature value can also be used in determining the radius of the curve that the vehicle will be taking. Such a radius can be used in calculating the desired yaw rate of the vehicle. In some implementations, vehicle driven distance can be determined with millimeter-range accuracy using a rear wheel speed sensor. The distance traveled by the wheel of the speed sensor can be converted to a distance traveled by any part of the vehicle geometry, including, but not limited to, the center of gravity of the vehicle. The lane sensing information (e.g., as a lane sensing data stream) and the vehicle driven distance can be continuously available to the ADAS during operation.

In this example, at the initial location 202, the satellite signal is weakened or lost. Time starting from the moment of weakening/loss is here indicated by n time intervals, where n=1, 2, 3, . . . . The vehicle sensor system will provide the vehicle status, including but not limited to the following information: a vehicle speed v(n) and a vehicle curvature α(n). The sensor system will keep providing the vehicle status information at regular intervals, as indicated by respective times t(n). Localization can be provided based on aggregating distances determined for some or all of the intervals. The time intervals can be sufficiently short so that the vehicle trajectory can be divided into short distances. A linear model and integral solution can be used to calculate vehicle geometry information to create accurate road/lane information for an ADAS map while the satellite signal is weak or lost. Model examples are described below with reference to FIG. 3. The ego vehicle geometry information at time interval n can be expressed using the following formulas:

$$Dx = \sum v(t)t(n)\cos\alpha(n) + x0, \text{ and}$$

$$Dy = \sum v(t)t(n)\sin\alpha(n) + y0,$$

where (Dx, Dy) are to be associated with each other as the estimated location of the vehicle, and α(n) is the vehicle curvature at each time instant. That is, Dx is a sum of transverse distances, and Dy is a sum of longitudinal distances.

In the illustration, multiple travel segments are shown beginning at the initial location 202, each associated with an index 0, 1, 2, (n), or (f), as follows. The indices 0, 1, and 2 are here the three first ones among an indefinite series of travel segments. The index (n) represents an arbitrary segment within the trajectory, and (f) is the index for the final segment of those that are being considered. A reference direction 206 can be defined for each of the travel segments. The reference direction 206 can be oriented in any direction, including, but not limited to, in an east-west direction of a ground coordinate system. For each of the travel segments, an axis can be defined regarding the vehicle so that the vehicle curvature at that segment is the angle between the axis and the reference direction 206. Here, an axis 208-0 is associated with a vehicle curvature α0, an axis 208-1 is associated with a vehicle curvature α1, an axis 208-2 is associated with a vehicle curvature α2, an axis 208-(n) is associated with a vehicle curvature α(n), and an axis 208-(f) is associated with a vehicle curvature α(f). In some implementations, each of the axes 208-0 through 208-(f) may extend toward both the left lane and the right lane. For example, the length of such extensions can reflect the distance to the left lane, and the distance to the right lane, respectively.

One or more road models can be used. In some implementations, a linear vehicle model or a curvature-based vehicle model can be used. A curvature-based vehicle model is a mathematical representation or model that describes the dynamics and behavior of a vehicle based on its curvature or trajectory. It focuses on capturing the vehicle's motion and response to changes in the curvature of the road or path it is following. In this model, the vehicle's motion is analyzed in terms of its position, velocity, acceleration, and other relevant parameters, taking into account the curvature of the road or path. By considering the curvature, the model can simulate and predict the vehicle's behavior, such as how it will turn, accelerate, decelerate, and handle different driving scenarios. The curvature-based vehicle model can provide a framework for understanding and predicting vehicle dynamics in relation to the road geometry. It helps autonomous systems make decisions and control the vehicle's motion based on the curvature of the road, ensuring safe and efficient navigation.

Figure 3:
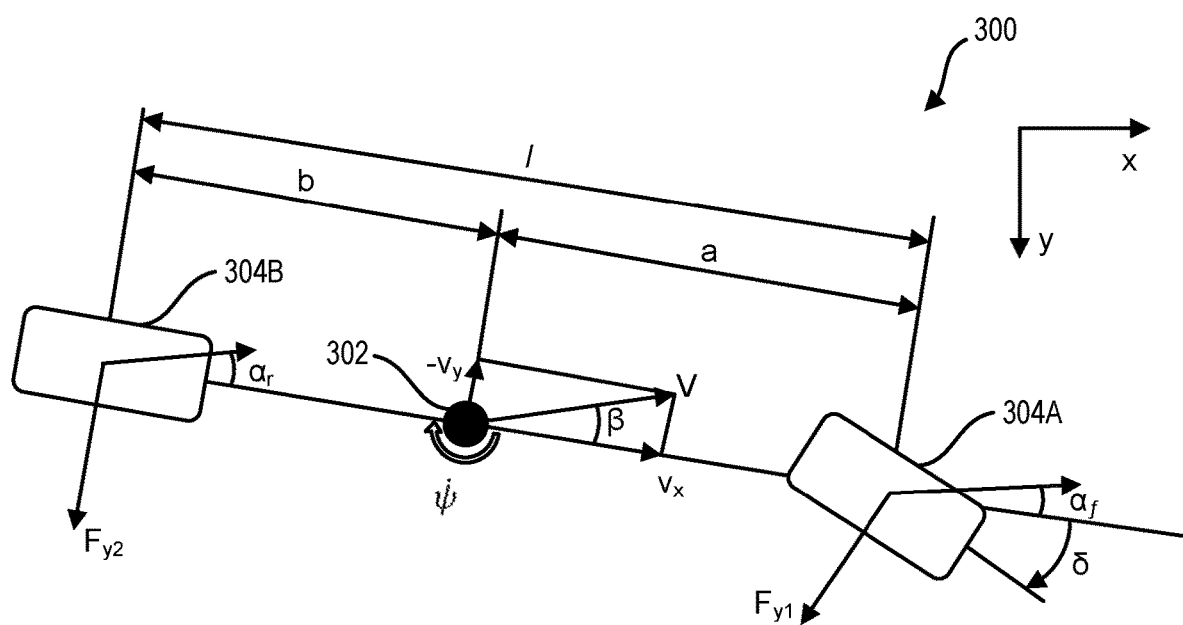
FIG. 3 shows an example of a linear vehicle model that can be used by an ADAS controlling a vehicle.

FIG. 3 shows an example of a linear vehicle model 300 that can be used by an ADAS controlling a vehicle. The linear vehicle model 300 can be used together with another example described elsewhere herein. In the linear vehicle model 300, the vehicle has a center of gravity 302, here represented as a point. The vehicle has a wheel 304A and a wheel 304B. In some implementations, the wheel 304A can represent one or more steerable wheels of the vehicle, and the wheel 304B can represent one or more non-steerable wheels. One or more of the wheels 304A-304B can be driven.

One or more equations of motion can be considered. For example, the sum of forces in the y-direction (Fy, i) can be taken into account. As another example, the moments in the z-direction (Mz), about the center of gravity 302 can be considered. These can be written as:

$$\sum F_{y,i} = may = m(\dot{v}_y + v_x\dot{\psi}) = F_{y1} + F_{y2}, \text{ and}$$

$$\sum Mz = Izz\ddot{\psi} = aF_{y1} - bF_{y2},$$

where m is the mass of the vehicle, ay is the lateral acceleration caused by the lateral motion ($v_y$) and the rotational motion ($\dot{\psi}$), $v_x$ is the longitudinal velocity, Izz is the vehicle yaw moment of inertia about the vertical axis (z-axis) of the vehicle, $\ddot{\psi}$ is the yaw acceleration, and a and b are the distances from the wheels 304B-304A, respectively, to the center of gravity 302. Moreover, it may be assumed that an angle δ between the wheel 304A and the centerline through the center of gravity 302 is relatively small.

One or more additional states can be considered. One additional state can be the lateral position of the vehicle within the lanes. Another additional state can be the relative heading angle between the vehicle and lane. These parameters can be measured using one or more sensors (e.g., a camera) and can be expressed as:

$$v_y = \beta v_x + \psi h v_x, \text{ and}$$

$$\dot{\psi}h = \dot{\psi} - v_x\rho,$$

where β is the vehicle side slip angle about the center of gravity 302, $v_y$ is the velocity in the lateral direction, ψh is the relative heading angle, and ρ is the road curvature.

Sensor-based model equations (e.g., based on vision) show the change in what the sensor (e.g., a camera) would detect as the vehicle moves in the lateral direction within the lane. The speed sensor can provide longitudinal position with high (e.g., millimeter-range) accuracy. Therefore, the ego location can be calculated from measurement data when the satellite signal is weak or lost.

If the vehicle is in motion at one side of the road, the detected relative heading value would be a certain measured value. However, if the vehicle moves closer to the center of the lane, then the perceived relative heading changes. That is, even though the road parameters are the same, the camera will detect a different value because the position and orientation of the vehicle has changed. When the satellite signal is weakened or lost, a road geometry database still needs to be built for the ADAS to continue controlling the vehicle motion. One or more sensors can be operating. For example, a camera and an inertial measurement unit (IMU) can currently be in operation. Functionality such as lane-keeping assist, lane centering control, and/or other lane assistance can be turned on. The road/lane database can therefore be built for the ADAS map also when the satellite signal is weak or lost.

In the example with the linear vehicle model 300, the motion of the vehicle is assumed to be confined to the x,y-plane. If the vehicle is driving in a slope area, this may present a more complex situation. For example, the IMU and/or another sensor with z-axis information can then be used.

Figure 4:
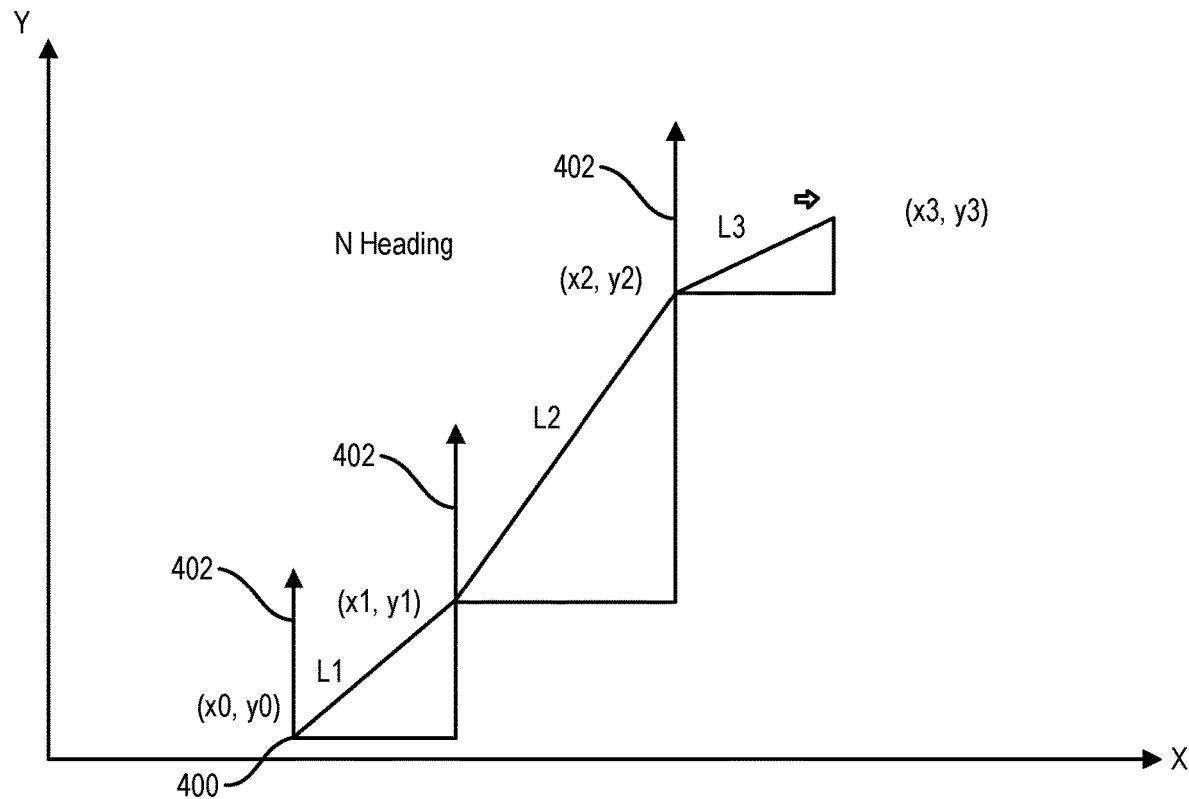
FIG. 4 shows an example where a vehicle is controlled by an ADAS using a heading angle of the vehicle.

FIG. 4 shows an example where a vehicle is controlled by an ADAS using a heading angle of the vehicle. In some implementations, the control takes place during a period of weak satellite navigation signal. One or more aspects of the example can be used together with another example described elsewhere herein. The vehicle begins at an initial location 400 having coordinates (x0, y0). In this example, at the initial location 400, the satellite signal is weakened or lost. Time starting from the moment of weakening/loss can be indicated by m time intervals, where m=1, 2, 3, . . . . In the illustration, multiple travel segments are shown beginning at the initial location 400, each associated with an index 1, 2, 3, . . . , so that travel segments L1, L2, and L3 are shown. Localization can be provided based on aggregating distances determined for some or all of the travel segments.

For each of the travel segments, a heading angle of the vehicle can be defined relative to a reference direction, including, but not limited to, with regard to a north direction 402. The heading angle can be defined using a geomagnetic device, including, but not limited to, using a magnetometer of the vehicle. Here, the travel segment L1 can be associated with a heading angle Heading 1, the travel segment L2 can be associated with a heading angle Heading 2, and the travel segment L3 can be associated with a heading angle Heading 3. The localization of the ego vehicle at a point (x3, y3), while the satellite signal is weak or lost, can be determined based on the above data using the following formulas:

$$x3 = x0 + L1*\cos(90 - \text{Heading } 1) +$$
$$L2*\cos(90 - \text{Heading } 2) + L3*\cos(90 - \text{Heading } 3), \text{ and}$$
$$y3 = y0 + L1*\sin(90 - \text{Heading } 1) +$$
$$L2*\sin(90 - \text{Heading } 2) + L3*\sin(90 - \text{Heading } 3).$$

That is, x3 is a sum of transverse distances, and y3 is a sum of longitudinal distances.

Figure 5:
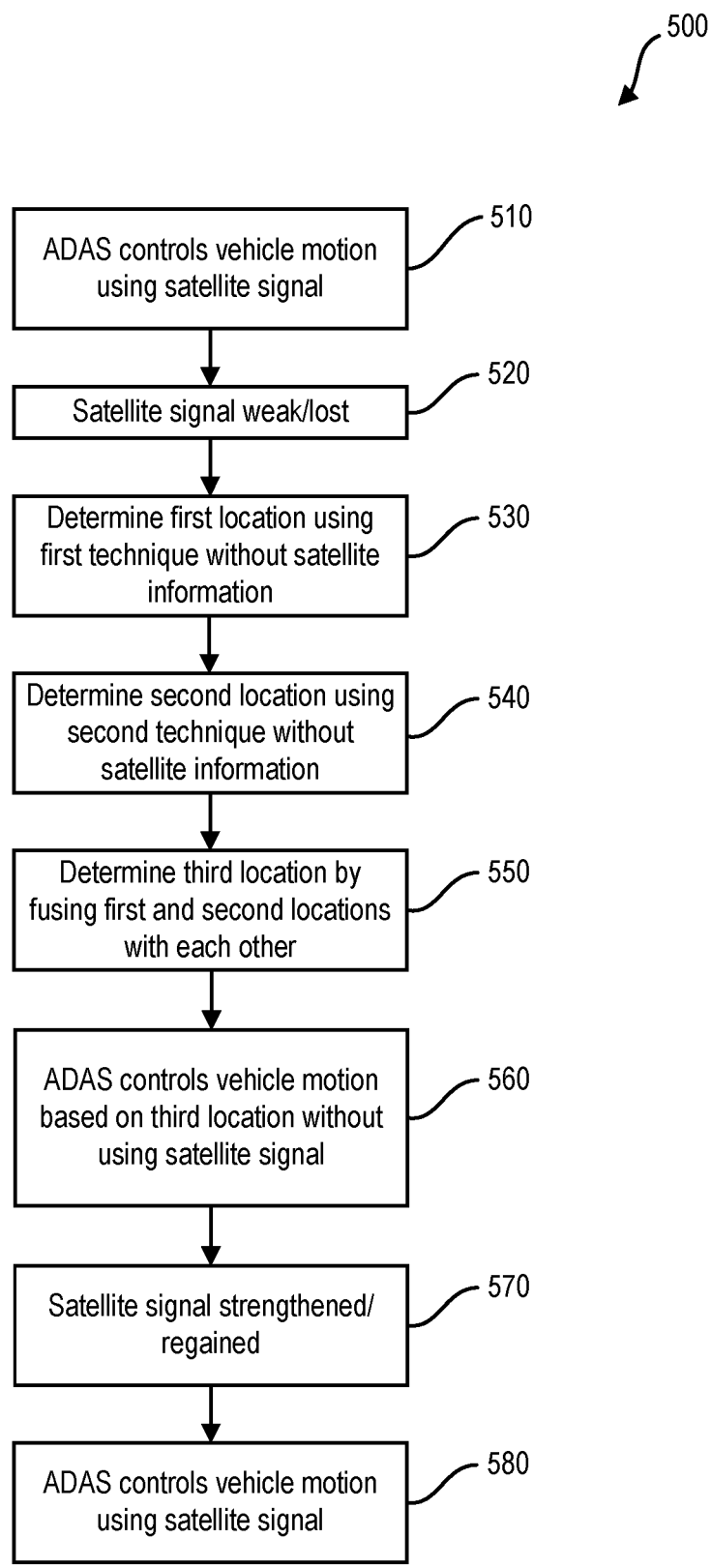
FIG. 5 shows a flowchart of an example of a process performed by an ADAS.

FIG. 5 shows a flowchart of an example of a process 500 performed by an ADAS. In some implementations, the control takes place during a weak satellite navigation signal. The process 500 can be used together with another example described elsewhere herein. More or fewer operations than shown can be performed. Two or more operations can be performed in a different order unless otherwise indicated.

In operation 510, an ADAS can control the motion of a vehicle using satellite navigation information from a satellite signal. The satellite signal has at least a threshold signal strength during the operation 510. For example, a satellite receiver can see at least a threshold number of satellites. This can be the situation prior to the initial location 202 in FIG. 2, and/or prior to the initial location 400 in FIG. 4. The satellite navigation information provides localization for the vehicle so that its motion can be controlled accordingly.

In operation 520, a detection can be performed that the satellite signal no longer has the threshold signal strength. For example, the detection includes a determination that fewer than the threshold number of satellites are currently seen by the satellite receiver. In implementations where control of a vehicle performed using two or more of static objects, a vehicle heading angle, or a vehicle curvature occurs also without first losing a satellite signal, the operation 520 can be omitted.

In operation 530, a first location for the vehicle can be determined without the satellite navigation information using a first technique. The first technique can include any of the detection of static objects as exemplified with reference to FIG. 1, the detection of vehicle curvature as exemplified with reference to FIG. 2, or the detection of vehicle heading angle as exemplified with reference to FIG. 4.

In operation 540, a second location for the vehicle can be determined without the satellite navigation information using a second technique. The second technique can include any of the detection of static objects as exemplified with reference to FIG. 1, the detection of vehicle curvature as exemplified with reference to FIG. 2, or the detection of vehicle heading angle as exemplified with reference to FIG. 4. That is, the second technique used in the operation 540 is a different technique than the first technique used in the operation 530.

In operation 550, a third location can be determined by fusing the first and second locations with each other. In some implementations, the third location is the average of the first and second locations. In some implementations, the third location is determined by weighting at least one of the first and second locations relative to the other. For example, the third location can be the location (x1, y1) in FIG. 1, the location (Dx, Dy) in FIG. 2, or the location (x3, y3) in FIG. 4.

In operation 560, the ADAS controls the vehicle motion based on the third location without using the satellite signal. For example, the third location can be used in building a road/lane database for the ADAS map.

In operation 570, a detection can be performed that the satellite signal again has the threshold signal strength. For example, the detection includes a determination that at least the threshold number of satellites are currently seen by the satellite receiver.

In operation 580, the ADAS can control the motion of the vehicle using the satellite navigation information when the satellite signal has at least the threshold signal strength. For example, the satellite-based location can be reset upon determining that the signal is strengthened or regained.

Figure 6:
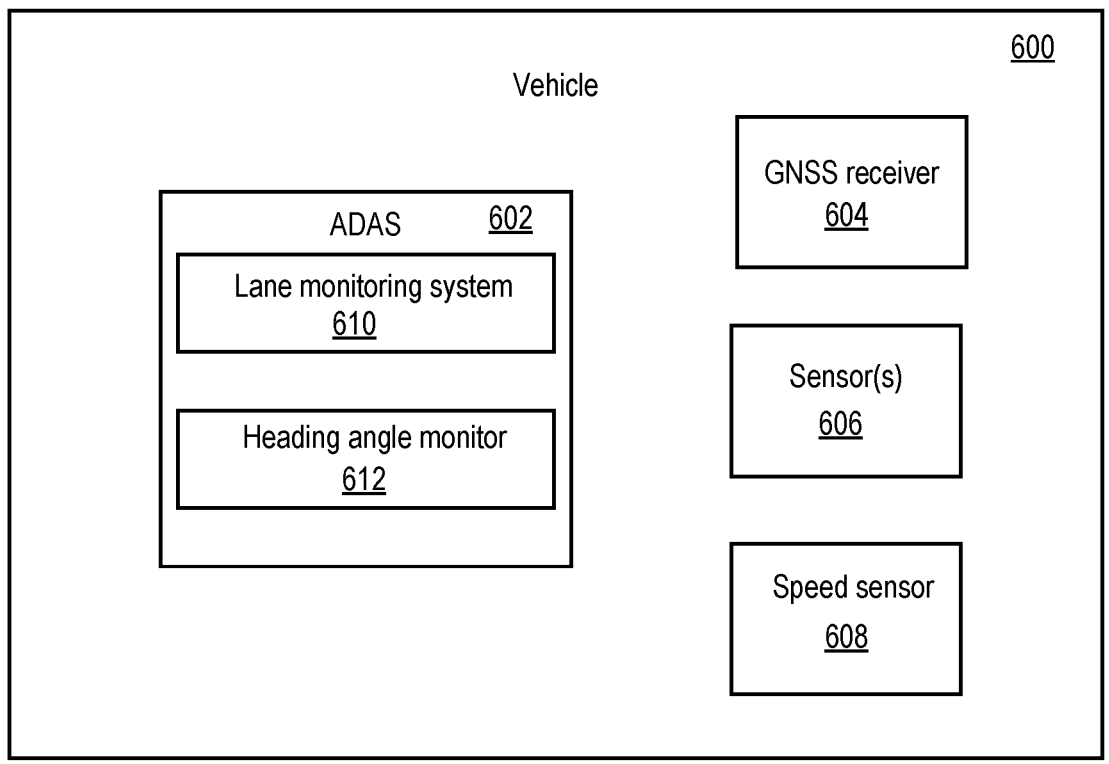
FIG. 6 shows an example of a vehicle.

FIG. 6 shows an example of a vehicle 600. The vehicle 600 can be used together with another example described elsewhere herein. The vehicle 600 can include more or fewer components than shown. For example, the vehicle 600 is here shown as a system diagram that for simplicity omits components such as vehicle body, powertrain, and wheels.

The vehicle 600 includes an ADAS that can be configured to receive respective outputs from a satellite receiver 604 (e.g., a GNSS receiver), at least one sensor 606 (e.g., a camera, LiDAR, and/or radar), and a speed sensor 608. For example, the speed sensor 608 can monitor the rotational speed of a wheel for determination of vehicle travel distance.

The ADAS 602 can include, or be configured to operate with, a lane monitoring system 610. In some implementations, the lane monitoring system 610 operates using the sensor(s) 606 to gather information about the lane of the ego vehicle and/or adjacent lanes. For example, the lane monitoring system 610 can perform functionality such as lane-keeping assist, lane centering control, and/or other lane assistance. The lane monitoring system 610 generates lane sensing information reflecting a vehicle curvature. The ADAS 602 can use the lane sensing information in controlling the motion of the vehicle 600 also when the satellite receiver 604 generates weak or no satellite navigation information.

The ADAS 602 can include, or be configured to operate with, a heading angle monitor 612. In some implementations, the heading angle monitor 612 uses the sensor(s) 606 (e.g., a magnetometer or other geomagnetic device) to output a heading angle of the vehicle 600. The ADAS 602 can use the heading angle in controlling the motion of the vehicle 600 also when the satellite receiver 604 generates weak or no satellite navigation information.

Figure 7:
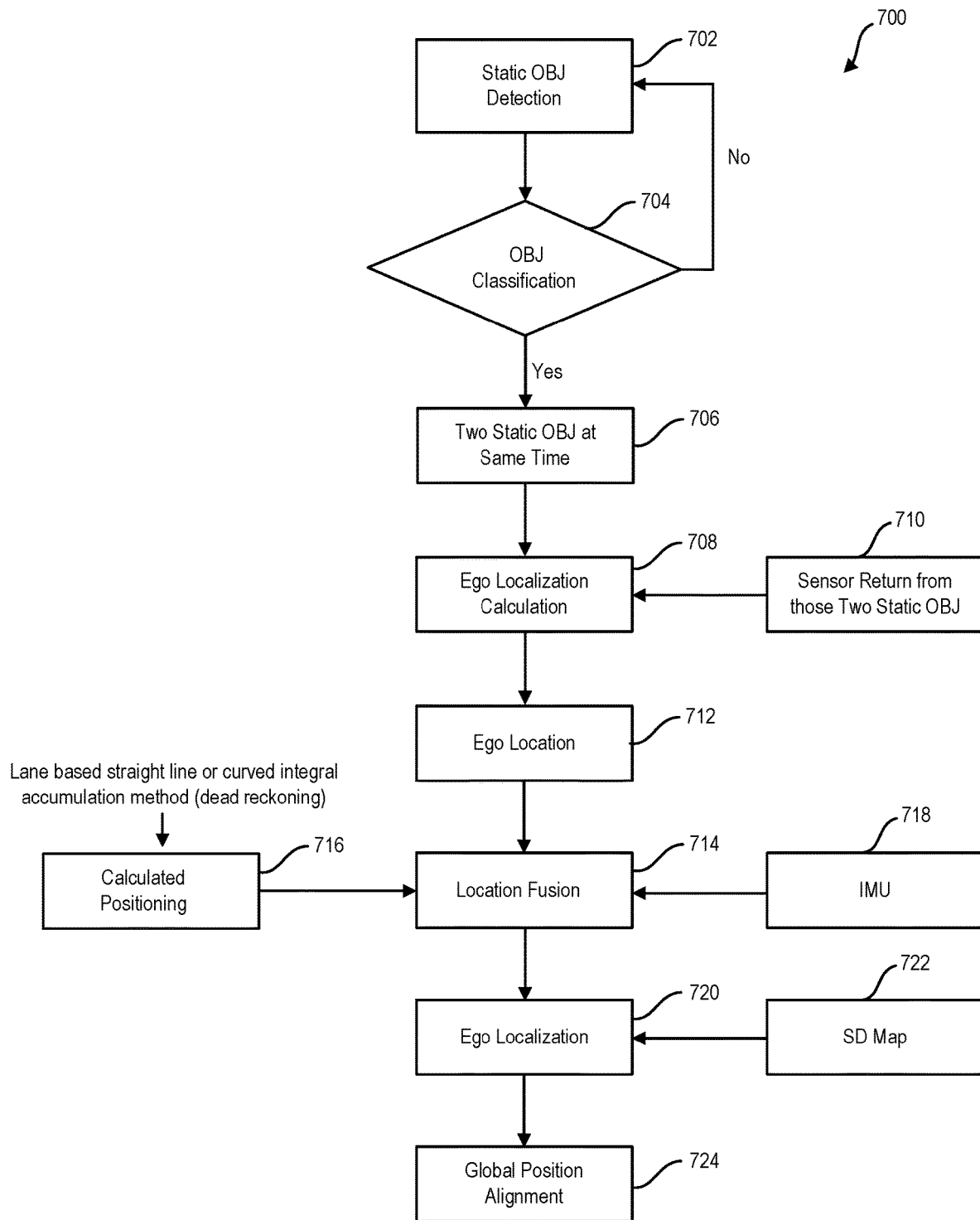
FIG. 7 shows a flowchart of another example of a process performed by an ADAS.

FIG. 7 shows a flowchart of another example of a process 700 performed by an ADAS. In some implementations, the control takes place during a weak satellite navigation signal. The process 700 can be used together with another example described elsewhere herein. More or fewer operations than shown can be performed. Two or more operations can be performed in a different order unless otherwise indicated.

In operation 702, at least two static objects can be detected based on at least one sensor return in a vehicle. For example, the sensor return can indicate the static objects 102-104 in FIG. 1. The detection of the objects in the sensor return can be aided by at least one map, such as an SD map that may contain global positioning information about one or more static objects. For example, an accuracy range for a landmark's location can be within about a 5-30 meter error from the SD map or another reference map.

In operation 704, a determination can be made whether the detected static objects have been classified. For example, the classification can indicate whether the static object is a building, a traffic sign or any other type of static object. If the outcome of the determination in operation 704 is no, the process 700 can return to the operation 702.

In operation 706, the process 700 has detected at least two static objects at the same time. In operation 708, an ego localization calculation can be performed based on at least the detected static objects. In some implementations, a sensor return 710 from the at least two static objects can indicate a distance between the vehicle and the respective static object. For example, the sensor return 710 can indicate the distances 116 and/or 120 in FIG. 1.

In operation 712, an ego location has been determined based on the ego localization calculation in operation 708.

In operation 714, at least two locations for the vehicle are fused with each other to determine a more accurate location. The at least two locations have been determined using any of the techniques described herein. At least one of the locations to be fused may have been determined in operation 716. A dead reckoning can be performed in the operation 716. In some implementations, the operation 716 involves a lane-based straight line location determination. For example, the lane sensing information as described with reference to FIG. 2 can be used. In some implementations, a curved integral accumulation can be performed. For example, the heading angle of a vehicle as described with reference to FIG. 4 can be used. In some implementations, the fusing involves calculating an average between the determined locations. In some implementations, the fusing involves weighting at least one of the determined locations.

The fusion in the operation 714 can also involve receiving input from an IMU in an operation 718. An IMU can measure a vessel's angular rate and acceleration. These readings are sometimes combined with global positioning and navigation equipment, and IMUs can then calculate the position and orientation of a device with six degrees of freedom (x, y, z, and pitch, roll, and yaw). In these applications, IMUs are sometimes used to correct for antenna offset or to improve accuracy in navigation and orientation. IMUs can provide real time kinematic positioning, which allows for an extremely accurate estimation of a device's position with errors as low as 1-2 cm. This high accuracy can be achieved using sophisticated algorithms and sensors such as gyroscopes, accelerometers, magnetometers, and pressure sensors. The IMU information can also or instead provide odometry for an elevation dynamic test.

In operation 720, a localization of the ego vehicle is performed based on the fusion of determined locations in the operations 714. The localization can be performed with information obtained in an operation 722 from a map (e.g., an SD map). The operation 720 can serve to give a general idea of where the vehicle is located.

In operation 724, a global position alignment can be performed based on the information obtained previously in the process 700. The operation 724 can serve to place the ego vehicle in alignment with a global position. For example, the operation 724 can localize the vehicle in relation to a map, and the ADAS uses this in controlling the motion of the vehicle.

Figure 8:
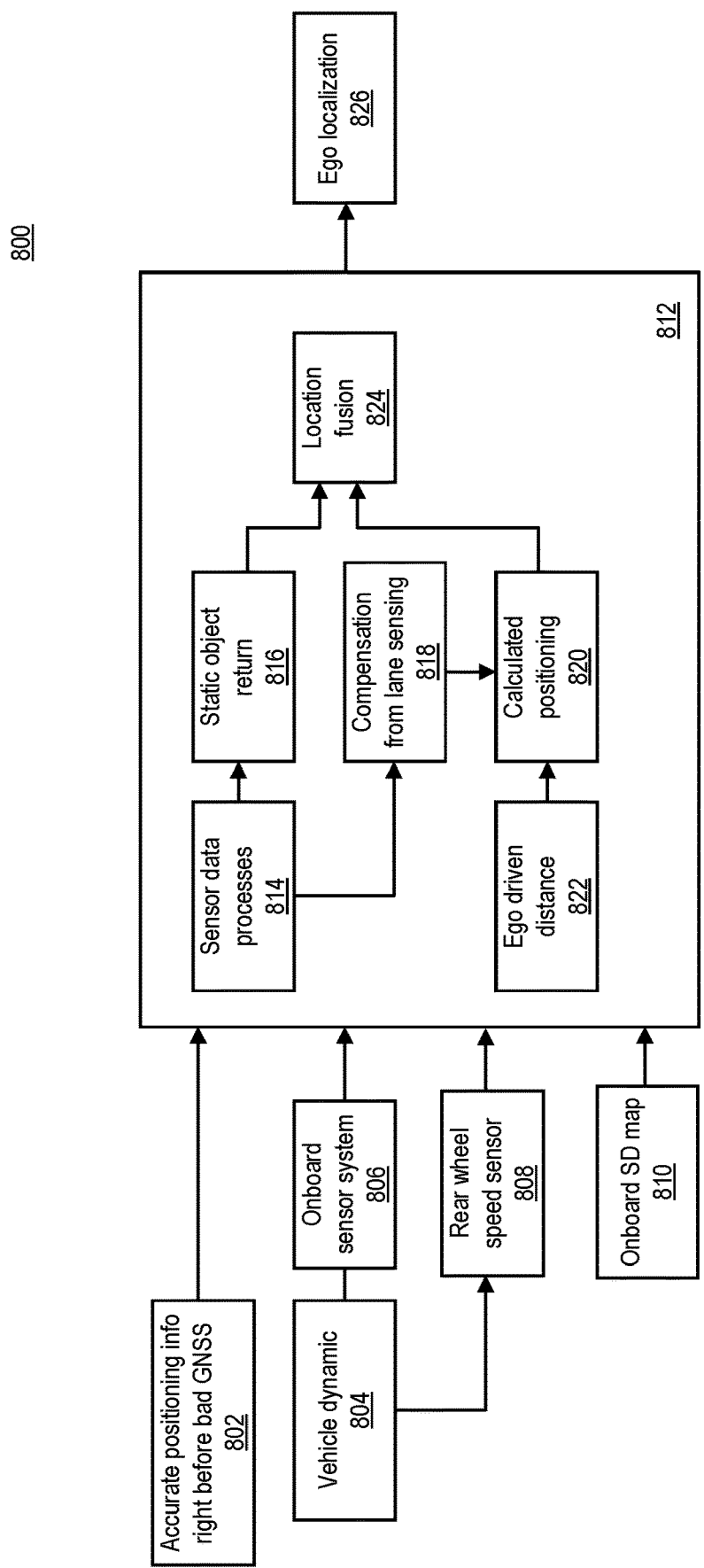
FIG. 8 shows an example of a process flow where an ADAS controls a vehicle.

FIG. 8 shows an example of a process flow 800 where an ADAS controls a vehicle. In some implementations, the control takes place during a weak satellite signal. The process flow 800 can be used together with another example described elsewhere herein. More or fewer components than shown can be included.

Positioning information 802 can be obtained from a satellite receiver. The positioning information 802 can include accurate positioning information from immediately before the satellite signal became weak or was lost. In implementations where control of a vehicle performed using static objects and compensation from lane sensing occurs also without first losing a satellite signal, the information 802 can be omitted or used differently. A vehicle dynamic component 804 can be included in the vehicle. The vehicle dynamic component 804 can control an onboard sensor system 806 and a speed sensor 808 (e.g., a rear wheel speed sensor). A map 810 can be included in the vehicle (e.g., an SD map). Outputs of the positioning information 802, the onboard sensor system 806, and the map 810 can be provided to a stage 812.

The stage 812 can include sensor data processes 814 from which is obtained a static object return 816. The static object return 816 indicates at least two static objects relative to the vehicle. The stage 812 can provide a compensation 818 from lane sensing. The compensation 818 can be based on a lane curvature reflected in lane sensing information. The stage 812 can perform a calculated positioning 820 based on at least the compensation 818 and a driven distance 822 that can be obtained using the speed sensor 808. The stage 812 can perform location fusion 824 based on at least the static object return 816 and the calculated positioning 820 for a more accurate positioning. After the stage 812, the process flow 800 can perform an ego localization 826 based on the information from the stage 812. That is, performing the ego localization 826 while the satellite signal has less than the threshold signal strength allows an ADAS to control vehicle motion without continuously updated satellite navigation information.

Figure 9:
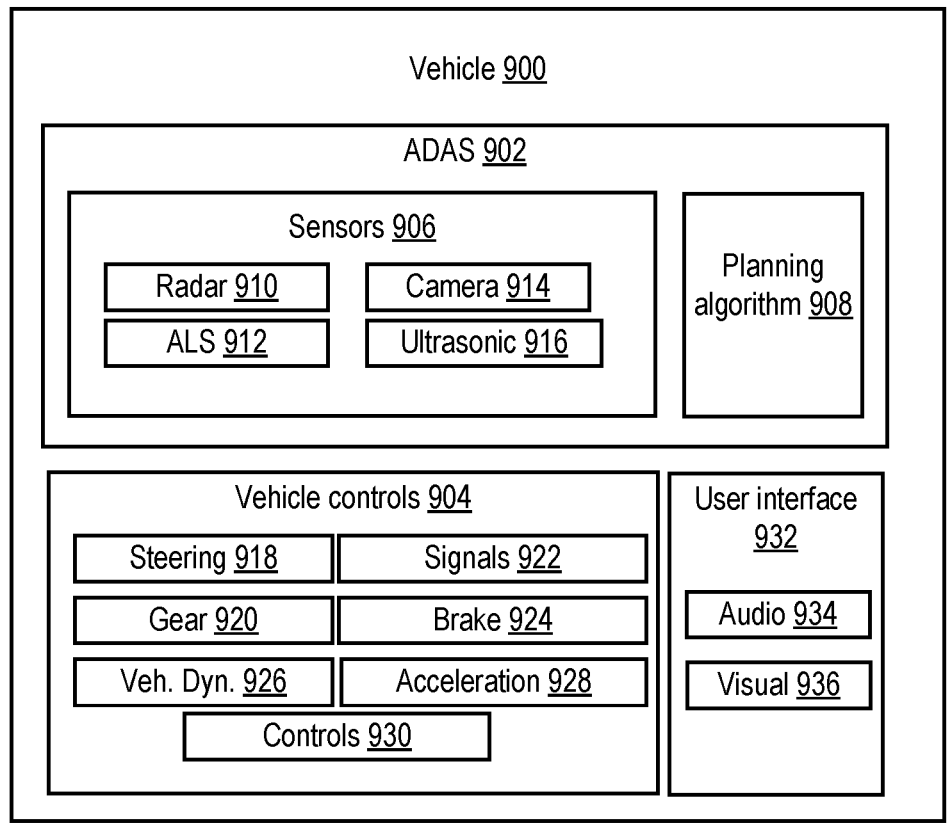
FIG. 9 shows another example of a vehicle.

FIG. 9 shows an example of a vehicle 900. The vehicle 900 can be used with one or more other examples described elsewhere herein. The vehicle 900 includes an ADAS 902 and vehicle controls 904. The ADAS 902 includes sensors 906 and a planning algorithm 908. Other aspects that the vehicle 900 may include, including, but not limited to, other components of the vehicle 900 where the ADAS 902 may be implemented, are omitted here for simplicity.

The sensors 906 are here described as also including appropriate circuitry and/or executable programming for processing sensor output and performing a detection based on the processing. The sensors 906 can include a radar 910. In some implementations, the radar 910 can include any object detection system that is based at least in part on radio waves. For example, the radar 910 can be oriented in a forward direction relative to the vehicle and can be used for detecting at least a distance to one or more other objects (e.g., another vehicle). The radar 910 can detect the surroundings of the vehicle 900 by sensing the presence of an object in relation to the vehicle 900.

The sensors 906 can include an active light sensor 912. In some implementations, the active light sensor 912 can include any object detection system that is based at least in part on laser light or LED light. For example, the active light sensor 912 can include a LiDAR. The active light sensor 912 can be oriented in any direction relative to the vehicle and can be used for detecting at least a distance to one or more other objects (e.g., another vehicle). The active light sensor 912 can detect the surroundings of the vehicle 900 by sensing the presence of an object in relation to the vehicle 900.

The sensors 906 can include one or more cameras 914. In some implementations, the cameras 914 can include any image sensor whose signal(s) the vehicle 900 takes into account. For example, the cameras 914 can be oriented in any of multiple directions relative to the vehicle and can be used for detecting vehicles or other objects, lanes, lane markings, curbs, and/or road signage.

The sensors 906 can include an ultrasonic sensor 916. The ultrasonic sensor 916 can include any device that determines location based on generating and detecting sound waves.

Any of the sensors 906 alone, or two or more of the sensors 906 collectively, can detect, whether or not the ADAS 902 is controlling motion of the vehicle 900, the surroundings of the vehicle 900. In some implementations, at least one of the sensors 906 can generate an output that is taken into account in providing a prompt to a driver, and/or in controlling motion of the vehicle 900. For example, the output of two or more sensors can be combined. In some implementations, one or more other types of sensors can additionally or instead be included in the sensors 906. The ADAS 902 can perform motion planning and/or plan a trajectory for the vehicle 900 based on the output(s) of one or more of the sensors 906.

The vehicle controls 904 can include a steering control 918. In some implementations, the ADAS 902 and/or another driver of the vehicle 900 controls the trajectory of the vehicle 900 by adjusting a steering angle of at least one wheel by way of manipulating the steering control 918. The steering control 918 can be configured for controlling the steering angle though a mechanical connection between the steering control 918 and the adjustable wheel, or can be part of a steer-by-wire system.

The vehicle controls 904 can include a gear control 920. In some implementations, the ADAS 902 and/or another driver of the vehicle 900 uses the gear control 920 to choose from among multiple operating modes of a vehicle (e.g., a Drive mode, a Neutral mode, or a Park mode). For example, the gear control 920 can be used to control an automatic transmission in the vehicle 900.

The vehicle controls 904 can include signal controls 922. In some implementations, the signal controls 922 can control one or more signals that the vehicle 900 can generate. For example, the signal controls 922 can control a turn signal and/or a horn of the vehicle 900.

The vehicle controls 904 can include brake controls 924. In some implementations, the brake controls 924 can control one or more types of braking systems designed to slow down the vehicle, stop the vehicle, and/or maintain the vehicle at a standstill when stopped. For example, the brake controls 924 can be actuated by the ADAS 902. As another example, the brake controls 924 can be actuated by the driver using a brake pedal.

The vehicle controls 904 can include a vehicle dynamic system 926. In some implementations, the vehicle dynamic system 926 can control one or more functions of the vehicle 900 in addition to, or in the absence of, or in lieu of, the driver's control. For example, when the vehicle comes to a stop on a hill, the vehicle dynamic system 926 can hold the vehicle at standstill if the driver does not activate the brake control 924 (e.g., step on the brake pedal).

The vehicle controls 904 can include an acceleration control 928. In some implementations, the acceleration control 928 can control one or more types of propulsion motor of the vehicle. For example, the acceleration control 928 can control the electric motor(s) and/or the internal-combustion motor(s) of the vehicle 900.

The vehicle controls 904 can include one or more other controls 930 in addition to those exemplified above.

The vehicle 900 can include a user interface 932. The user interface 932 can include an audio interface 934. In some implementations, the audio interface 934 can include one or more speakers positioned in the passenger compartment. For example, the audio interface 934 can at least in part operate together with an infotainment system in the vehicle.

The user interface 932 can include a visual interface 936. In some implementations, the visual interface 936 can include at least one display device in the passenger compartment of the vehicle 900. For example, the visual interface 936 can include a touchscreen device and/or an instrument cluster display.

Computer-based techniques, processes, components, or systems described herein can be implemented by way of one or more processors executing instructions stored in a non-transitory computer-readable medium.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method comprising:
   determining that a vehicle is at a first location;
   controlling motion of the vehicle using an advanced driver assistance system (ADAS);
   determining a second location for the vehicle based on receiving a first sensor return indicating at least a first static object and a second static object;
   determining a third location for the vehicle based on a heading angle of the vehicle and a first travel distance of the vehicle since the first location;
   determining a fourth location for the vehicle by fusing the second and third locations with each other; and
   controlling the motion of the vehicle using the ADAS based on the fourth location;
   wherein multiple travel segments are determined, wherein a corresponding heading angle is determined for each of the multiple travel segments, and wherein the third location is determined based on the multiple travel segments and the corresponding heading angles.

2. The method of claim 1, wherein determining that the vehicle is at the first location comprises receiving, by a satellite signal having at least a threshold signal strength, satellite navigation information indicating that the vehicle is at the first location, the method further comprising performing a first detection that the satellite signal no longer has the threshold signal strength, wherein the ADAS is configured to determine the second, third, and fourth locations in response to the first detection.

3. The method of claim 2, wherein the satellite navigation information is generated by a global navigation satellite system.

4. The method of claim 2, wherein the first detection comprises determining that the satellite navigation information contains information from less than a threshold number of satellites.

5. The method of claim 2, wherein the satellite navigation information that indicates the vehicle being at the first location is a most recent satellite navigation information when the satellite signal no longer has the threshold signal strength.

6. The method of claim 2, further comprising:
   performing, after controlling the motion of the vehicle using the ADAS based on the fourth location, a second detection that the satellite signal again has the threshold signal strength; and
   in response to the second detection, again controlling the motion of the vehicle using the ADAS based on the satellite navigation information.

7. The method of claim 1, further comprising performing localization of the vehicle based on the fourth location and map information.

8. The method of claim 7, further comprising performing global position alignment with regard to the vehicle based on the localization.

9. The method of claim 8, wherein the global position alignment is performed using a standard definition map.

10. The method of claim 1, wherein the heading angle is a measure calculated by the ADAS for use in controlling the motion of the vehicle.

11. The method of claim 1, wherein determining the third location comprises:
   determining a longitudinal coordinate using a first formula, the longitudinal coordinate based on the multiple travel segments, the corresponding heading angles, and a longitudinal coordinate of the first location;
   determining a transverse coordinate using a second formula, the transverse coordinate calculated based on the multiple travel segments, the corresponding heading angles, and a transverse coordinate of the first location; and
   associating the longitudinal coordinate and the transverse coordinate with each other.

12. The method of claim 1, wherein determining the third location comprises compensating the second location using the heading angle.

13. The method of claim 1, wherein the first sensor return is generated by at least one of a camera, a light detection and ranging device, or a radar device.

14. The method of claim 1, further comprising classifying the first and second static objects before determining the second location.

15. The method of claim 1, wherein fusing the second and third locations with each other comprises calculating an average of the second and third locations.

16. The method of claim 1, wherein fusing the second and third locations with each other comprises weighting at least one of the second or third locations in determining the fourth location.

17. The method of claim 1, wherein at least the second, third and fourth locations are determined with regard to a center of gravity of the vehicle.

18. A method comprising:
   determining that a vehicle is at a first location;
   controlling motion of the vehicle using an advanced driver assistance system (ADAS);
   determining a second location for the vehicle based on receiving a first sensor return indicating at least a first static object and a second static object;
   determining a third location for the vehicle based on a heading angle of the vehicle and a first travel distance of the vehicle since the first location;
   determining a fourth location for the vehicle by fusing the second and third locations with each other; and
   controlling the motion of the vehicle using the ADAS based on the fourth location;
   wherein determining that the vehicle is at the first location comprises receiving, by a satellite signal having at least a threshold signal strength, satellite navigation information indicating that the vehicle is at the first location, the method further comprising performing a first detection that the satellite signal no longer has the threshold signal strength, wherein the ADAS is configured to determine the second, third, and fourth locations in response to the first detection;
   wherein determining the second location comprises:
   determining, based on the satellite navigation information and the first sensor return, a first distance between the first location and the first static object;
   determining, based on the satellite navigation information and the first sensor return, a second distance between the first location and the second static object;
   receiving, after performing the first detection, a second sensor return indicating at least the first static object and the second static object;
   determining, based on the first travel distance and the second sensor return, a third distance between the vehicle and the first static object; and
   determining, based on the first travel distance and the second sensor return, a fourth distance between the vehicle and the first static object; and
   wherein the second location is determined based on the third and fourth distances and the first travel distance.

19. A non-transitory computer readable medium storing instructions that when executed by at least one processor cause operations to be performed, the operations comprising:
   determining that a vehicle is at a first location;
   controlling motion of the vehicle using an advanced driver assistance system (ADAS);
   determining a second location for the vehicle based on receiving a first sensor return indicating at least a first static object and a second static object;
   determining a third location for the vehicle based on a heading angle of the vehicle and a first travel distance of the vehicle since the first location;
   determining a fourth location for the vehicle by fusing the second and third locations with each other; and
   controlling the motion of the vehicle using the ADAS based on the fourth location;
   wherein multiple travel segments are determined, wherein a corresponding heading angle is determined for each of the multiple travel segments, and wherein the third location is determined based on the multiple travel segments and the corresponding heading angles.

20. A vehicle comprising:
   an advanced driver assistance system (ADAS) configured to control motion of the vehicle, the ADAS including a heading angle monitor configured to determine a heading angle of the vehicle;
   a sensor configured to generate a first sensor return indicating at least a first static object and a second static object; and
   a speed sensor configured to determine a first travel distance of the vehicle since a first location;
   wherein the ADAS is configured to i) determine a second location for the vehicle based on the first sensor return, ii) determine a third location for the vehicle based on the heading angle and the first travel distance, (iii) determine a fourth location for the vehicle by fusing the second and third locations with each other, and iv) control the motion of the vehicle based on the fourth location, wherein at least the second, third and fourth locations are determined with regard to a center of gravity of the vehicle.

21. The vehicle of claim 20, wherein the ADAS is further configured to determine multiple travel segments, to determine a corresponding heading angle for each of the multiple travel segments, and to determine the third location based on the multiple travel segments and the corresponding heading angles.

22. The vehicle of claim 20, further comprising a satellite receiver configured to receive a satellite signal having at least a threshold signal strength, the satellite signal including satellite navigation information indicating that the vehicle is at the first location, and wherein the ADAS is configured to determine the second, third, and fourth locations in response to a detection that the satellite signal no longer has the threshold signal strength.

23. The vehicle of claim 20, wherein the vehicle further comprises, and the first sensor return is generated by, at least one of a camera, a light detection and ranging device, or a radar device.

* * * * *